United States Patent Office 3,465,824
Patented Sept. 9, 1969

3,465,824
AQUEOUS CEMENTING COMPOSITION
AND METHOD OF USE
Clare H. Kucera, Tulsa, Okla., assignor to The Dow
Chemical Company, Midland, Mich., a corporation of
Delaware
No Drawing. Filed Nov. 7, 1966, Ser. No. 592,266
Int. Cl. E21b 33/14; C04b 7/02, 7/12
U.S. Cl. 166—293                                6 Claims

ABSTRACT OF THE DISCLOSURE

A new well cementing composition, comprising an aqueous hydraulic cement slurry containing a small but effective amount of a bisulfite-modified phenol-formaldehyde condensation product which serves as a turbulence inducer to the slurry while being moved in a confined passageway and the method of cementing in an underground formation employing said composition.

---

The invention pertains to an aqueous hydraulic cement slurry and use thereof, particularly in cementing operations associated with the production of fluids from subterranean formations penetrated by a well. The term, hydraulic cement, as used herein, refers to portland cement, including aluminuous cements which contain a relatively high proportion of tricalcium aluminate and the expensive cements which contain a relatively high proportion of calcium sulfoaluminate, and to pozzolana cements which contain a relatively high proportion of light weight mineral sources such as fly ash and volcanic rock. Fluids of economic significance are presently obtained in large quantities from subterranean formations, largely by way of a well penetrating the formation.

For the successful production of a fluid from a subterranean formation by way of a well, it has long been the practice to cement the casing of the well in position and also to employ cement as a means of blocking off the flow of fluids where such flow is undesirable. Cementing off fluids in a subterranean formation includes both the prevention of the intrusion of undesirable fluids and prevention of the loss of desirable fluids.

The cement employed in cementing operations concerned with control of fluid production from subterranean formations usually consists principally of an hydraulic cement, as defined above, and sufficient water to provide a readily pumpable and flowable composition (usually referred to as neat cement) which becomes, upon standing, a strong monolithic solid.

However, it has been found that selected additaments to the aqueous cement composition impart desirable properties to the composition. Among such additaments are those which lessen the loss of fluid to the formation between the time the cement slurry is injected into the formation and the time the cement sets to a solid. Recently it has been discovered that the existence of a state referred to as turbulence in a cement slurry being injected down the well and into position is highly advisable. Such turbulence has extensive economic significance because an aqueous cement slurry exhibiting relatively high turbulence removes adhering mud from the walls of the borehole and provides a superior bond between the formation and the casing when cementing a casing in place, or provides a better seal when sealing off encroaching water or brine as in squeeze cementing.

Although there has been a recent awareness that increased turbulence in an aqueous cement slurry during emplacement thereof in a well during a cementing operation has beneficial effects during the emplacement and upon the quality of the finished job, techniques to attain the turbulent state without excessive expenditure of energy over that normally required have not been fully satisfactory.

The invention provides an improved aqueous cement composition and method of use. The aqueous cement composition of the invention has a low yield point and coefficient of rigidity which provides improved turbulence, is easily mixed, is free of objectionable settling of solids, exhibits less tendency to bridging, and affords excellent resistance to contamination. The aqueous cement slurry prepared according to the invention can be pumped down a wellbore in a turbulent state without increased pumping rate and positioned as desired in the well or formation whereupon it sets, at a desirable rate, as positioned, to a high compressive strength monolithic mass forming superior bonds with the formation.

Among effective additives to lessen fluid loss to a subterranean formation is hydroxyethyl cellulose (HEC). A disadvantage of this additive is its adverse effect upon the pumpability and good contact made by the emplaced slurry with the formation. HEC may be used in highly effective amounts in the cement composition of the invention.

The objectives of the invention are attained principally because the improved cement composition moves through the pipes and tubing in a turbulent flow (as opposed to laminar flow) at pumping rates which heretofore did not produce a turbulent flow. Such desired turbulent flow is obtained by the practice of the invention without objectionable loss in the desired properties of the slurry. No detectable adverse effects accompany the practice of the invention.

The invention encompasses an improved cement composition which consists essentially of between about 30 and 65 parts of water, between about 0.01 and 10 parts by weight of a bisulfite-modified phenol-formaldehyde condensation product, and 100 parts by weight of an hydraulic cement. Such condensation product employed in accordance with the practice of the invention will sometimes be referred to hereinafter as a turbulence inducer. A specific embodiment of the invention is the use of HEC with the condensation product in a cement slurry. The amount of HEC is not highly critical, between about 0.25 and 1.75 parts per 100 parts by dry weight of cement present being recommended.

By the term "bisulfite-modified" in reference to the condensation product is meant the reaction product of a phenol-formaldehyde resin and either a bisulfite alone or the product of a previously reacted mixture of a sugar, a sugar ester, or a sugar amine, and a bisulfite. The latter will be usually referred to herein as the bisulfite addition product.

The sugars which may be employed in the practice of the invention include: All common monosaccharides among which are the bioses, trioses, tetroses, pentoses, e.g., xylose and arabinose; hexoses, e.g. mannose, glucose, fructose, and gulose; heptoses, e.g. glucoheptose and mannoheptose, octoses, nonoses, decoses; all common disaccharides among which are lactose, cellobiose, sucrose, and maltose; inverted sugars, e.g. mannitol; and long chain sugars, e.g. dextrin. Illustrative of a sugar ester is delta-gluconolactone. Illustrative of a sugar amine is N-methylglucamine.

The bisulfite modified phenol-formaldehyde condensation product may be prepared by following any of the three procedures set out below:

(1) The first procedure is as follows:

(A) A solution of a sugar, sugar ester, or sugar amine, and a bisulfite, e.g., $NaHSO_3$, are each individually dissolved in water and the resulting solutions mixed together. There is formed by this admixture a pale yellow-brown solution of bisulfite addition product.

(B) A molar excess of phenol is admixed with an aqueous sodium hydroxide solution which contains formaldehyde in molar amount in excess of the phenol present. The phenol-formaldehyde alkaline solution is then heated for between about 2 and 4 hours at between about 50° and 120° C., preferably between 80° and 100° C.

(C) While the solution prepared in (B) above is still at about the reaction temperature, e.g., between about 80° and 100° C., the solution prepared in (A) above is admixed therewith. Heating is continued to maintain the 80° to 100° C. temperature for about an additional hour and then cooled. The result is a pale reddish-brown substantially homogeneous solution. The solution so prepared is in condition for use in the practice of the invention and can be readily admixed either with the aqueous cement slurry or can be admixed with the dry cement.

A specific example of procedure 1 is set forth hereinafter.

(2) The second procedure is as follows:

(A) An aqueous solution of an alkali metal hydrogen sulfite is prepared.

(B) Phenol and an aqueous solution of formaldehyde are admixed so as to provide a molar excess of formaldehyde in an aqueous sodium hydroxide solution, heated to between about 50° and 120° C., preferably between about 80° and 100° C. and maintained at that temperature for between one and four hours. Thereafter the heat control is removed so as to permit the reaction (which is exothermic) to rise to about 120° C.

(C) The solution prepared in (B) above is then added to solution prepared in (A) above when the temperature thereof has risen to about 120° C. An emulsion results which is stirred and controlled at a temperature of about 100° C. for about an additional two hours. At the end of this time the entire composition becomes substantially homogeneous.

A specific example of procedure 2 is set forth hereinafter.

(3) The third procedure is as follows:

(A) An aqueous solution of a sugar, sugar ester, or sugar amine, is admixed with an aqueous solution of sodium bisulfite to prepare the bisulfite addition product.

(B) Cresol, phenol, and an aqueous solution of NaOH are admixed and the desired amount of an aqueous solution of formaldehyde then admixed therewith. The resulting solution is then heated, accompanied by stirring, under reflux conditions. There is thereby produced a cresol-phenol-formaldehyde condensation product.

(C) The condensation product prepared in (B) immediately above is flowed into the solution of the bisulfite addition product prepared in (A) immediately above and the resulting mixture heated, e.g. to between about 50° and 100° C. accompanied by stirring, until a sample thereof, when drawn, diluted with water, and acidified with glacial acetic acid, yields a completely clear solution. This usually occurs after from about 1½ to 2 hours of heating. The pH value desired is within the range of between about 3.5 and 4.5. It may be readily adjusted, as needed, by adding either additional acetic acid to lower the pH or additional NaOH to raise the pH.

A specific example of procedure 3 is set out hereinafter.

More specifically, procedures 1 and 2 and 3 above may be carried out as exemplified below:

Series one.—Example of procedure 1
(1)

(A) 50 grams of NaHSO₃ are dissolved in 65 milliliters of water and thereafter 100 grams of glucose, previously dissolved in 100 milliliters of water, admixed therewith. The result, as stated above, is the formation of the bisulfite addition product which is here a pale yellow brown solution of glucose-bisulfite.

(B) 200 grams of C₆H₅OH are admixed with 200 milliliters of 37 percent by weight HCHO containing 10 grams of NaOH dissolved therein. The resulting mixture is heated for about 3½ to 4 hours at about 80° C.

(C) Solutions prepared according to (A) and (B) immediately above are mixed together and stirred for about an hour at about 85° C. The product is a pale reddish-brown homogeneous solution.

The solution so prepared can be admixed, without further preparation, with an aqueous hydraulic cement slurry, in accordance with the invention, to increase turbulence of flow of such slurry when it is moved through a conduit.

Example of procedure 2
(2)

(A) 50 grams of NaHSO₃ are dissolved in 60 milliliters of water.

(B) 200 grams of C₆H₆OH are admixed with 200 milliliters of a 37 percent by weight HCHO aqueous solution containing 10 grams of NaOH dissolved therein, the resulting mixture heated to about 80° C., and the temperature then controlled without substantial change for about three hours. Thereafter the reaction is allowed to rise, as a result of exothermic heat, to 120° C.

(C) The aqueous bisulfite solution prepared in (A) immediately above is admixed with the phenol-formaldehyde product of (B) immediately above while the temperature of (B) is at about 120° C. The temperature is thereafter controlled at about 100° C. for about two hours, accompanied by stirring, until a homogeneous solution is obtained.

Example of procedure 3
(3)

(A) A solution of 200 parts of d-glucose is dissolved in 200 parts of water and allowed to flow, at a temperature of 50° C., into a solution of 104 parts of NaHSO₃ dissolved in 130 parts of water.

(B) Admixture of 409.6 parts of a mixture of cresol and phenol, of an approximate weight ratio of 60 cresol to 40 phenol were placed in a reaction vessel provided with stirrer and reflux condenser. To the vessel were admixed 10 parts of NaOH dissolved in 15 parts of water to which had previously been admixed 400 parts of a 30 percent by weight aqueous formaldehyde solution. The ensuing reaction was accompanied by stirring under reflux for about an hour at 70° C. and thereafter refluxed and stirred for an additional five hours at 80° C. A cresol-phenol-formaldehyde condensation product is made.

(C) The condensation product of (B) prepared immediately above is then allowed to flow into the glucose bisulfite solution prepared in (A) immediately above and the resulting mixture heated, accompanied by stirring, at about 90° C., periodically drawing samples from the reaction mixture and diluting and acidifying the samples so drawn with glacial acetic acid until a sample shows substantial clarity. After about 1½ to 2 hours a clear solution is obtained indicating completion of the reaction. The resulting product is usually adjusted to the pH of between 3.5 and 4.5 prior to use. This is conveniently accomplished by adding more acetic acid to lower the pH or NaOH to raise the pH.

It is to be noted, by the methods of preparation and examples of the improved bisulfite-modified condensation product set out above, that it may be prepared by the reaction of a phenolic compound, an aldehyde, and either a bisulfite or a sugar which is modified by reaction with a bisulfite.

The tests of Series two illustrate the practice of the invention showing that the admixture of the phenol-formaldehyde and a sugar reaction product with an aqueous cement slurry, in accordance with the invention, imparts highly desirable improved flow characteristics to the cement slurry. The tests were conducted as follows:

Series two.—Examples 1 to 12

In the examples, two mixtures were prepared. One mixture comprising the bisulfite or modified bisulfite is designated (X). The second comprising the phenol-HCHO reaction product is designated (Y). The two mixtures, or components, were thereafter mixed together to make the resin additive for aqueous cement slurries according to the invention.

(X) A solution of glucose-bisulfite was prepared by dissolving 150 grams of $NaHSO_3$ in 195 ml. of water. 300 grams of glucose were dissolved in 300 ml. of water and the resulting solution admixed with the bisulfite solution. An additional 20 ml. of water were then added thereto to provide a completely clear solution. The resulting glucosebisulfite addition product in solution had a 55 to 60 percent glucose-bisulfite total solids.

(Y) A phenol-formaldehyde resin component was then prepared in aliquot amounts as follows:

Into each of three reaction vessels (a, b, and c), each comprising a 1000 ml. beaker fitted with a magnetic stirrer and positioned on an electric heating plate were put 200 grams of phenol, 300 ml. of 37 percent by weight of HCHO in water, and 10 grams of NaOH pellets. The reaction of the mixture was initiated by mild heating and thereafter, due to the exothermic nature of the reaction, the temperature rose to about 100° C.; thereafter it cooled to 80° C. and was maintained at about that temperature for about three hours. At that point the reaction, due to a second exothermic condition, was allowed to rise to about 100° C. At that temperature, each reaction mixture was tested for its solubility in dilute aqueous $CH_3COOH$ and each was found to be insoluble. The resin compositions were then allowed to cool to a temperature of about 80° C. They are hereinafter identified as a, b, and c resins.

Aliquot portions of the (X) solution made as described above were then admixed with each (Y) component to provide proportions by weight of total solids present of bisulfite-sugar addition product to phenol-formaldehyde solids (Y) as follows:

|     | (X) The 55–60 percent aqueous solution of bisulfite-sugar addition product | (Y) The phenol-formaldehyde component |
| --- | --- | --- |
| (a) | 1 part | 2 parts. |
| (b) | 2 parts | 3 parts. |
| (c) | 1 part | 1 part. |

Each resulting reaction mixture (X and Y) was stirred while being maintained at about 80° C. for about one hour whereupon each became an homogeneous fluid composition. The resulting resin compositions so made were transferred while about 80° C. to suitable storage vessels and were allowed to cool to room temperature. Each resulting material for use in those examples set forth hereinafter which employed these mixtures is designated (a), (b), or (c), in agreement with like designations above, and in amounts corresponding to the ratios of X (i.e., glucose-bisulfite solutions) to resin Y (phenol-formaldehyde) therein set forth.

Another resin composition designated (d) of this series for use in examples described hereinafter employing the resin so designated was prepared as follows:

150 grams of $NaHSO_3$ were dissolved in 195 ml. of water. 150 grams of lactose were dissolved in 30 ml. of water in a separate container and the two solutions so made were mixed together. 300 grams of phenol-formaldehyde resin (which is substantially the resin prepared by reacting a slight molecular excess of HCHO with phenol in an aqueous basic reaction medium) was then admixed therewith. The mixture so made was stirred and maintained at a temperature of between about 80° and 90° C. until an homogeneous resin solution was obtained.

Another resin composition designated (e) of this series was prepared exactly as (d) except that sucrose was employed instead of lactose and is so designated in the examples employing it.

A further resin composition of this series designated (f) was prepared as follows:

(X) 50 grams of $NaHSO_3$ were dissolved in 65 ml. of water and the resulting solution admixed with a solution consisting of 100 grams of glucose dissolved in 100 ml. of water. A clear pale yellow solution of bisulfite-modified glucose resulted.

(Y) 200 grams of phenol were admixed with a solution consisting of 10 grams of NaOH pellets dissolved in 200 ml. of 37 percent by weight HCHO, the resulting mixture heated to 90° C. and maintained at that temperature until the action had been substantially completed, then cooled to about 75° C., and allowed to react for 3½ to 4 hours during which, due to exothermy, the temperature rose to about 110° C.

At that temperature, solution (X) was admixed with solution (Y). After about an hour the resulting mixture of (X) and (Y) became a red-brown colored clear, homogeneous liquid. This resin is designated (f) in the examples hereinafter which employ it.

The following procedure was employed for each of the six compositions prepared in this series (Examples 1 to 12) as described above:

An API Class A portland cement as described in API STD 10A (10th edition) was used in the amount of 100 parts by weight. All other ingredients of the compositions identified as (a) to (f) were used in amounts based upon 100 parts by weight of the cement.

Mixing was accomplished in accordance with the procedure given in Section Two, pages 5 and 6 of API RP 10B (13th edition), (hereinafter usually referred to as merely "10B" for ease of expression). It was found that the bisulfite or bisulfite-addition product and phenol-formaldehyde resin was an excellent dispersant for hydraulic cement in water.

Initial viscosity values in each of the examples of Series two were obtained by employing a Fann Model 35-V-G meter. The readings were taken at 600 r.p.m., and 300 r.p.m.

Rheological properties of the examples of the aqueous hydraulic cement containing the bisulfite-modified phenol-formaldehyde resin additive were ascertained by determining the coefficient of rigidity (designated $n$), and the yield value (designated $ty$) which, when used in the calculation subsequently explained, give the turbulence of a liquid in motion.

Turbulency is a calculated value expressed as critical pumping rate in barrels per minute which are required to induce turbulency and is based upon determined values of yield point and coefficient of rigidity according to the following procedure: The following values are obtained or measured: The diameters of the borehole; the outside diameter of the pipe through which the slurry will be injected into the well; the density of the slurry in pounds per gallon; the coefficient of rigidity $n$ in pounds per second-foot; and the yield value $ty$ in pounds per square foot. The $n$ and $ty$ values are calculated from the Fann viscosimeter in accordance with Section 10 of API RP 10B, 13th ed. (1964) and as herein described. The critical pump rate at which laminar flow becomes turbulent flow is then calculated according to the equation:

$$PR_c = \frac{140(D_h + D_p)}{a}\left[n + \sqrt{\frac{n^2 + (D_h - D_p)^2 ty a}{2690}}\right]$$

where:

$PR_c$ is the critical pump rate in barrels per minute;
$D_h$ is the diameter of the borehole in inches;
$D_p$ is the outside diameter of the pipe in inches;
$a$ is the density of the slurry in pounds per gallon;
$n$ is the coefficient of rigidity in pounds per second-foot;
$ty$ is the yield value in pounds per square foot.

Turbulent flow may be ascertained by calculating the coefficient of rigidity (designated n as aforestated) and yield value (designated ty as aforestated) from the Fann viscometer values by the prescribed procedure of the Fann Instrument Corporation, 3202 Argonne, Houston, Tex. The coefficient of rigidity is expressed in pounds per second-foot and tensile value is expressed in pounds per square foot. The viscometer employed is the Model 35 Fann rotational viscometer. To determine these values by the use of the viscometer, the cement is dry mixed and the dry cement then made into a slurry, employing the procedure and proportions of cement and water specified in Section 2, Table 2.2 of API RP 10B, i.e., 46 parts of water per 100 parts of dry cement by weight. The slurry so made is immediately transferred to the Fann sample cup. The instrument reading of the Fann viscometer is then ascertained at a speed of 600 revolutions per minute (r.p.m.). After the reading has become stabilized at the 600 r.p.m. speed, the instrument is adjusted to 300 r.p.m. and the reading again recorded after the value becomes stabilized at that speed. The coefficient of rigidity $n$ and the yield value $ty$ are calculated as follows:

$$n = N(600 \text{ reading} - 300 \text{ reading})(0.000672)$$

$$ty = N\left[\frac{300 \text{ reading} - (600 \text{ reading} - 300 \text{ reading})}{100}\right]$$

N=in the above equations is the extension factor of the torque spring of the instrument.

This is a value for each instrument and is a part of the directions for use of the instrument obtainable from the Fann Company.

Each of the examples, after viscosity measurements had been obtained, was transferred to a Bariod low-pressure filter press for fluid loss determination in accordance with the procedure described in Section 5, pages 7 and 8 of 10B and fluid loss thereof obtained by such procedure except that a 500 mesh screen was employed instead of the 325 mesh screen specified in the procedure. (The mesh size referred to is that used by the U.S. Bureau of Standards Sieve Series.) The tests were run at a pressure of 100 p.s.i. for a period of 30 minutes or until 50 ml. of fluid had passed through the screen if such time were less than 30 minutes.

The time required for the cement to set was determined by the use of a Vicat needle in accordance with the procedure set out in ASTM 191–58 as revised in 1958. All samples were tested for setting rate at 100° F. Readings were taken at one hour intervals. The ratio of water to cement in the series tested for the setting rate was 186 ml. of deionized water and 400 grams of API Class A portland cement. The turbulence inducer was added to the deionized water prior to admixing the cement and water. Mixing was carried out in a Waring blender over a period of 15 to 30 seconds prior to adding the cement to the water containing the turbulence inducer.

The slurry which was used in making rheological measurements and fluid loss control determinations was also used for determining compressive strengths. Compressive strength values were obtained by pouring the slurry into four ml. glass vials, the vials capped, and then lightly tapped to cause any entrapped air to rise to the top of the slurry. The vials were then placed in a 150° F. constant temperature water bath for the length of time shown in the following table, together with compressive strength value set out in the following table. Upon removal from the 150° bath, each glass vial was broken and the set cement sample thus exposed was cut to a length of 1½″ thereby providing a cylinder having two parallel circular end pieces. Each sample was then crushed in a Tinius-Olsen testing machine following the recommended practice for the use of such machine. The readings were then computed to pounds per square inch, employing the factor 1.426 according to recommended procedure.

The rate of setting was observed for each of the slurries so prepared and was found to be three hours for the blanks and slightly longer but highly satisfactory for the numbered examples.

The rheological properties and the fluid loss properties of the slurries and the compressive strength of the set cement of Examples 1 to 12 and two control experiments, designated blanks, are shown in Table I which follows.

TABLE I

[Each of the following tests contain: 400 grams of class A portland cement, 186 ml. of de-ionized water, and the turbulence inducer set out]

| Test identification | Turbulence inducer | Concentration in weight percent | Rheological Properties of Slurry | | Fluid Loss of Slurry | | Compressive Strength in p.s.i. |
|---|---|---|---|---|---|---|---|
| | | | n Value | ty Value | Time in sec. | Ml. | |
| Blank | None | | .010 | .81 | 39 | 50 | 4,100 after 3 days. |
| 1 | (a) | 0.5 | .017 | .005 | 16 | 50 | 1,950 after 3 days. |
| 2 | (a) | 1.0 | .020 | .005 | 21 | 50 | 3,850 after 3 days. |
| 3 | (b) | 0.5 | .015 | .06 | 18 | 50 | 3,000 after 3 days. |
| 4 | (b) | 1.0 | .017 | .04 | 20 | 50 | 4,400 after 3 days. |
| 5 | (c) | 0.5 | .017 | .03 | 20 | 50 | 3,300 after 3 days. |
| 6 | (c) | 1.0 | .019 | .005 | 20 | 50 | 3,150 after 3 days. |
| Blank | None | | .010 | .92 | 39 | 50 | 4,150 after 1 day. |
| 7 | (d) | 0.5 | .022 | .08 | 15 | 50 | 3,100 after 1 day. |
| 8 | (e) | 0.5 | .019 | .07 | 14 | 50 | 2,600 after 1 day. |
| 9 | (f) | 0.5 | .016 | .67 | 34 | 50 | 3,400 after 1 day.[1] |
| 10 | (f) | 1.0 | .019 | .19 | 17 | 50 | 1,800 after 1 day.[1] |
| 11 | (d) | 1.0 | .019 | .005 | 14 | 50 | 2,800 after 1 day. |
| 12 | (e) | 1.0 | .019 | .005 | 15 | 50 | 3,400 after 1 day. |

[1] These set cement samples had small voids in them due to some entrained air.

Reference to the table shows that lower $ty$ values resulted when the additive, according to the invention, was employed and, although the $n$ value increased somewhat when the additive was present, the critical pump rate in barrels per minute, when calculated, that were required to create turbulence was less. The compressive strength values show that the presence of the condensate required by the invention does not objectionably affect them. The fluid loss control of the slurry is shown to be acceptable.

Series three.—Examples 13 to 34

The above examples were repeated employing one of the resin compositions designated (a) to (f) above, in an aqueous Class A portland cement slurry containing the condensate required by the practice of the invention execept that the examples (excluding certain of the blanks run for control purposes) contained hydroxyethyl cellulose as a fluid loss control agent. The tests for rheological properties and fluid loss of the slurry and compression strength of the set cement were conducted substantially the same as in series two. The setting time was measured on a number of the examples and found to be somewhat lengthened in the example over the blanks but was fully satisfactory for general usage and to some extent preferable for certain uses including well-cementing where some retardation in rate of setting is desired. The amounts of ingredients and the results obtained are shown in Table II.

tified below as (g), (h), and (i); (j), (k), and (l); (m), (n), and (o).

Resin (g) was made by employing 10 grams of arabinose and 5 grams of NaHSO$_3$ in 50 ml. of water to pre-

TABLE II

[Each of the following tests contains: 400 grams of class A portland cement, 186 ml. of de-ionized water, the amount of turbulence inducer and the amount of hydroxyethyl cellulose shown]

| Test identification | Turbulence inducer | Concentration in weight percent | Hydroxyethyl cellulose conc. in weight percent | Rheological properties of slurry | | Fluid loss of slurry | | Compressive strength in p.s.i. |
|---|---|---|---|---|---|---|---|---|
| | | | | n Value | ty Value | Min. | Sec. | Ml. |
| Blank | None | | None | .013 | 1.00 | | 33 | 50 | 3,600 after 1 day. |
| Do | do | | 0.5 | .087 | 2.25 | 15 | 21 | 50 | 3,900 after 1 day. |
| 13 | (a) | 0.5 | 0.5 | .0°1 | .35 | 30 | | 10 | 2,550 after 1 day. |
| 14 | (b) | 0.5 | 0.5 | .087 | .50 | 30 | | 7 | 2,650 after 1 day. |
| 15 | (c) | 0.5 | 0.5 | .094 | .70 | 30 | | 8 | 3,100 after 1 day. |
| 16 | (b) | 1.0 | 0.5 | .037 | .80 | 30 | | 11 | 20 after 1 day. |
| 17 | (c) | 1.0 | 0.5 | .097 | .95 | 30 | | 5 | 40 after 1 day. |
| Blank | None | | None | .013 | 1.05 | | 43 | 50 | 4,500 after 2 days. |
| 18 | (a) | 0.5 | 1.0 | .198 | 1.80 | 30 | | 5 | 3,750 after 2 days. |
| 19 | (b) | 0.5 | 1.0 | .198 | 2.20 | 30 | | 4 | 3,550 after 2 days. |
| 20 | (c) | 0.5 | 1.0 | .235 | 3.50 | 30 | | 3 | 4,200 after 2 days. |
| 21 | (a) | 1.0 | 1.0 | .205 | 2.15 | 30 | | 4 | 170 after 2 days. |
| 22 | (b) | 1.0 | 1.0 | .223 | 2.60 | 30 | | 3 | 4,150 after 2 days. |
| 23 | (c) | 1.0 | 1.0 | .225 | 3.80 | 30 | | 4 | 2,950 after 2 days. |
| Blank | None | | None | .013 | 1.00 | | 47 | 50 | 4,350 after 3 days. |
| 24 | (f) | 0.5 | 0.5 | .091 | 2.65 | 20 | | 50 | 2,850 after 3 days.[1] |
| Blank | None | | None | .013 | 1.00 | | 44 | 50 | 5,200 after 1 day. |
| 25 | (d) | 0.5 | 0.5 | .121 | .75 | 30 | | 8 | 4,250 after 1 day. |
| 26 | (e) | 0.5 | 0.5 | .074 | .60 | 30 | | 26 | 2,050 after 1 day. |
| 27 | (f) | 1.0 | 0.5 | .081 | 1.15 | 19 | | 50 | 1,450 after 1 day.[1] |
| 28 | (d) | 1.0 | 0.5 | .037 | .55 | 30 | | 11 | 1,000 after 1 day. |
| 29 | (f) | 0.5 | 1.0 | .235 | 3.50 | 30 | | 8 | 3,400 after 1 day. |
| 30 | (d) | 0.5 | 1.0 | .239 | 2.30 | 30 | | 5 | 3,200 after 1 day. |
| 31 | (e) | 0.5 | 1.0 | .225 | 2.55 | 30 | | 7 | 100 after 1 day. |
| 32 | (f) | 1.0 | 1.0 | .265 | 3.40 | 30 | | 5 | 1,150 after 1 day.[1] |
| 33 | (d) | 1.0 | 1.0 | .225 | 2.05 | 30 | | 9 | 20 after 1 day. |
| 34 | (e) | 1.0 | 1.0 | .252 | 2.75 | 30 | | 5 | 1,700 after 1 day. |

[1] These set cement samples had small voids in them, attributed to some air entrained thereby by too rapid mixing.

Table II shows that hydroxyethyl cellulose lowers the fluid loss in a highly acceptable manner and further shows that such decrease in fluid loss is acquired without objectionable sacrifice of the turbulence of the aqueous cement slurry containing the condensate required by the invention. The compressive strength of the set cement was not adversely affected.

Series four

The following examples were performed according to the procedure set out below:

(X) Measured weights of a selected sugar, sugar ester, or sugar amine and of NaHSO$_3$, and 50 ml. of water were mixed together at room temperature.

(Y) 200 grams of phenol, 10 grams of NaOH pellets, and 200 m. of 37% by weight HCHO in water were admixed at 80° C. The ensuing reaction was exothermic causing the temperature to rise to 100° C. where it leveled off for a time and subsequently rose, due to further exothermy, to 120° C.

The (X) and (Y) components so prepared were then mixed together to make the resins which are further indenpare component (X) which was thereafter admixed with component (Y).

Resin (h) was made by employing 25 grams of xylose and 13 grams of NaHSO$_3$ in 50 ml. of water to prepare component (X) which was thereafter admixed with component (Y).

Resin (i) was made by employing 25 grams of dextrin and 13 grams of NaHSO$_3$ in 50 ml. of water to prepare component (X) which was thereafter admixed with component (Y).

Resins (j), (k), and (l) of this series were prepared by admixing 13 grams of NaHSO$_3$ and 25 grams of each of maltose for resin (j), galactose for resin (k), and mannitol for resin (l), respectively, in 50 ml. of water.

Further examples (m), (n), and (o) of this series were prepared as those above except that the sugar or sugar derivative employed was delta-gluconolactone for resin (m); N-methyl-glucamine for resin (n); and D-fructose for resin (o).

The reaction conditions were substantially the same as in the preceding tests.

TABLE III

[Each of the following tests contain: 400 grams class A portland cement, 186 ml. of de-ionized water, 0.1% antifoamer, and the turbulence inducer in the concentration indicated in the table (expressed as percent by weight of the dry cement)]

| Test No. | Turbulence inducer | Concentration in weight percent | Rheological properties of slurry | | Fluid loss of slurry | | Compressive strength at 150° F. in p.s.i. |
|---|---|---|---|---|---|---|---|
| | | | n Value | ty value | Time in sec. | ml. | |
| Blank | None | | .010 | 0.80 | 37 | 50 | 4,000 after 1 day. |
| 35 | (g) | 0.5 | .013 | 0.15 | 19 | 50 | 50 after 1 day. |
| 36 | (g) | 1.0 | .017 | 0.15 | 23 | 50 | Set after 1 day.[1] |
| 37 | (h) | 0.5 | .013 | 0.15 | 18 | 50 | 2,750 after 1 day. |
| 38 | (h) | 1.0 | .017 | 0.05 | 21 | 50 | 2,050 after 1 day. |
| 39 | (i) | 0.5 | .017 | 0.10 | 19 | 50 | 2,850 after 1 day. |
| 40 | (i) | 1.0 | .020 | 0.005 | 20 | 50 | 50 after 5 days. |
| 41 | (j) | 0.5 | .020 | 0.005 | 16 | 50 | 3,050 after 1 day. |
| 42 | (j) | 1.0 | .017 | 0.005 | 15 | 50 | 2,700 after 1 day. |
| 43 | (k) | 0.5 | .020 | .005 | 19 | 50 | 3,000 after 1 day. |
| 44 | (k) | 1.0 | .017 | .005 | 23 | 50 | 2,800 after 1 day. |
| 45 | (l) | 0.5 | .013 | .45 | 165 | 50 | 3,500 after 5 days. |
| 46 | (l) | 1.0 | .020 | .05 | 38 | 50 | 3,850 after 5 days. |
| 47 | (m) | 0.5 | .013 | 1.05 | 25 | 50 | 250 after 1 day. |
| 48 | (m) | 1.0 | .020 | .15 | 21 | 50 | Set after 1 day.[1] |
| Blank | None | | .013 | .70 | 38 | 50 | 4,150 after 14 days. |
| 49 | (n) | 0.5 | .024 | .15 | 22 | 50 | 7,950 after 14 days. |
| 50 | (n) | 1.0 | .020 | .05 | 26 | 50 | 6,900 after 14 days. |
| 51 | (o) | 0.5 | .013 | .25 | 28 | 50 | 3,500 after 2 days. |
| 52 | (o) | 1.0 | .020 | .45 | 26 | 50 | Do. |

[1] Set after the number of days indicated but not yet strong enough to test by standard procedure.

The test of this series were conducted by preparing an aqueous cement slurry consisting of 400 grams of Class A cement, 186 ml. of water, 0.1% of polyoxypropylene glycol of a molecular weight of about 4000 as an antifoamer, and the amount of turbulence inducer, according to the invention, set out in Table III, infra. The rheologial and fluid loss properties of the resulting slurry and the compressive strength of the set cement after a stated number of days are shown in Table III, above.

Reference to Table III shows that a cement slurry containing various species of the turbulence inducer according to the invention has good rheological properties and reduced fluid loss. It also shows that the setting time of the cement may be retarded to some extent by the presence of the turbulence inducer which makes it highly desirable for use in deep or high temperature wells. Where retardation is not desired, an accelerator to set, e.g. CaCl$_2$, may be employed in a small but effective amount.

Series five

In this series, the resins, as identified in Table III, supra, were employed except that in each test a specified amount of hydroxyethylcellulose as a fluid loss control agent was admixed therewith.

The tests otherwise were run similarly to those above wherein 400 grams of Class A cement, 186 grams of deionized water, 0.1% (by weight of cement) of polyoxyalkylene glycol as an antifoamer, and the amount of turbulence inducer in accordance with the invention, as set out in Table IV, were mixed together. The rheological and fluid loss properties of the cement slurry and the compressive strength of the set cement are shown in Table IV.

it is not satisfactorily pumpable) may be effectively used due to the presence of the turbulence inducer in accordance with the practice of the invention.

Having described my invention, what I claim and desire to protect by Letters Patent is:

1. An improved aqueous hydraulic cement slurry which attains a state of turbulence at lower rates of flow through a conduit than those at which turbulence normally exists, which more completely fills voids and spaces into which it is emplaced, and which sets to a hard monolithic solid mass of high compressive strength, said slurry consisting essentially by weight of between about 30 and 65 parts of water, between about 0.01 and 10.0 parts of the reaction product of a phenol-formaldehyde condensation product and a bisulfite composition selected from the class consisting of bisulfites and bisulfite addition products of sugars, sugar esters, and sugar amines, and about 100 parts of an hydraulic cement selected from the class consisting of portland, aluminous, sulfoaluminous, and pozzolanic cements and mixtures thereof.

2. The aqueous hydraulic cement slurry of claim 1 wherein the bisulfite composition is a bisulfite sugar addition product.

3. The aqueous hydraulic cement slurry of claim 2 wherein said bisulfite composition is prepared by reacting a bisulfite with a member selected from the class consisting of bioses, trioses, tetroses, pentoses, hexoses, heptoses, octoses, nonoses, decoses, lactose, cellobiose, sucrose, maltose, inverted sugars, hydrated sugars, dextrin, delta-gluonolactone, and N-methylglucamine.

4. In the process of forcing, in a turbulent state, a slurry comprising water, hydroxyethyl cellulose, and a hydraulic cement selected from the class consisting of aluminous,

TABLE IV

[Each of the following tests contains: 400 grams class A portland cement, 186 ml. de-ionized water, 0.1% antifoamer, the amount set out herein of hydroxyethylcellulose as a fluid loss control agent, and the turbulence inducer, in the concentration indicated in the table (expressed as percent by weight of the dry cement)]

| Test No. | Turbulence inducer | Concentration in weight percent | Concentration of HEC [1] | Rheological properties of slurry | | Fluid loss of slurry in— | | Compressive strength at 150° F. in p.s.i. |
|---|---|---|---|---|---|---|---|---|
| | | | | n Value | Ty Value | Min. | Sec. | Ml. |
| Blank | None | None | None | .013 | .70 | 0 | 30 | 50 | 5,150 after 1 day. |
| Do | | None | 0.5 | .074 | 1.35 | 7 | 40 | 50 | 3,450 after 1 day. |
| Do | | None | 1.0 | .188 | 2.70 | 30 | | 6 | 4,300 after 1 day. |
| 53 | (g) | 0.5 | 0.5 | .090 | .75 | 30 | | 12 | 450 after 1 day. |
| 54 | (g) | 1.0 | 1.0 | .225 | 2.80 | 30 | | 9 | 50 after 1 day. |
| 55 | (g) | 1.0 | 0.5 | .084 | .60 | 30 | | 13 | Set.[2] |
| 56 | (g) | 0.5 | 1.0 | .228 | 2.85 | 30 | | 6 | 3,500 after 2 days. |
| 57 | (h) | 0.5 | 0.5 | .054 | .40 | 30 | | 12 | 3,150 after 1 day. |
| 58 | (h) | 1.0 | 1.0 | .235 | 3.50 | 30 | | 5 | 5,200 after 1 day. |
| 59 | (h) | 1.0 | 0.5 | .114 | .80 | 30 | | 12 | 50 after 1 day. |
| 60 | (h) | 0.5 | 1.0 | .208 | 2.70 | 30 | | 5 | 3,400 after 2 days. |
| 61 | (i) | 0.5 | 0.5 | .084 | .50 | 30 | | 13 | 100 after 1 day. |
| 62 | (i) | 1.0 | 1.0 | .188 | 3.35 | 30 | | 6 | 3,700 after 8 days. |
| 63 | (i) | 1.0 | 0.5 | .107 | .65 | 30 | | 9 | 20 after 1 day. |
| 64 | (i) | 0.5 | 1.0 | .188 | 3.50 | 30 | | 6 | Set after 1 day.[2] |
| Blank | | | | | .85 | 0 | 36 | 50 | 3,850 after 1 day. |
| 65 | (j) | 0.5 | 0.5 | .107 | .75 | 30 | | 10 | 3,000 after 1 day. |
| 66 | (j) | 1.0 | 0.5 | .111 | .75 | 30 | | 11 | 2,850 after 1 day. |
| 67 | (j) | 0.5 | 1.0 | .252 | 2.95 | 30 | | 5 | 2,100 after 1 day. |
| 68 | (j) | 1.0 | 1.0 | .128 | 3.70 | 30 | | 6 | 1,900 after 1 day. |
| 69 | (k) | 0.5 | 0.5 | .047 | .95 | 30 | 30 | 10 | 2,550 after 1 day. |
| 70 | (k) | 1.0 | 0.5 | .094 | .60 | 30 | | 10 | 1,850 after 1 day. |
| 71 | (k) | 0.5 | 1.0 | .208 | 2.35 | 30 | | 6 | 1,250 after 1 day. |
| 72 | (k) | 1.0 | 1.0 | .222 | 3.40 | 30 | | 5 | Set after 1 day.[2] |
| 73 | (l) | 0.5 | 0.5 | .097 | 1.50 | 30 | | 12 | 4,500 after 5 days. |
| 74 | (l) | 1.0 | 0.5 | .118 | 1.00 | 30 | | 10 | 3,250 after 5 days. |
| 75 | (l) | 0.5 | 1.0 | .262 | 4.35 | 30 | | 3 | 3,200 after 5 days. |
| 76 | (l) | 1.0 | 1.0 | .198 | 4.30 | 30 | | 3 | 4,350 after 5 days. |
| Blank | | | 0.5 | .074 | 1.20 | 14 | 36 | 50 | 3,800 after 14 days. |
| Blank | | | 1.0 | .178 | 2.60 | 30 | | 4 | 7,900 after 14 days. |
| 77 | (m) | 0.5 | 0.5 | .074 | .55 | 30 | | 4 | 1,650 after 16 days. |
| 78 | (m) | 1.0 | 0.5 | .091 | .75 | 30 | | 4 | 3,050 after 16 days. |
| 79 | (m) | 0.5 | 1.0 | .215 | 2.00 | 30 | | 5 | 4,200 after 16 days. |
| 80 | (m) | 1.0 | 1.0 | .198 | 2.10 | 30 | | 5 | 4,950 after 16 days. |
| 81 | (n) | 0.5 | 0.5 | .081 | .85 | 30 | | 4 | 4,700 after 14 days. |
| 82 | (n) | 1.0 | 0.5 | .081 | .55 | 12 | | 50 | 3,850 after 14 days. |
| 83 | (n) | 0.5 | 1.0 | .188 | 2.70 | 30 | | 8 | 4,850 after 14 days. |
| 84 | (n) | 1.0 | 1.0 | .192 | 2.75 | 30 | | 8 | 2,900 after 14 days. |
| 85 | (o) | 0.5 | 0.5 | .097 | 2.15 | 30 | | 46 | 3,100 after 2 days. |
| 86 | (o) | 1.0 | 0.5 | .091 | 1.55 | 30 | | 35 | 4,100 after 2 days. |
| 87 | (o) | 0.5 | 1.0 | .178 | 3.90 | 30 | | 6 | 4,600 after 2 days. |
| 88 | (o) | 1.0 | 1.0 | .242 | 4.20 | 30 | | 6 | 3,400 after 2 days. |

[1] HEC is hydroxyethylcellulose. [2] Set but not yet strong enough after number of days shown to test by standard procedure.

Reference to Table IV shows similar advantages of the practice of the invention as are shown in the preceding tables and further shows that such fluid loss control agents as the cellulose ethers, e.g., hydroxyethyl cellulose (which usually result in thickening the slurry to the extent that portland, sulfoaluminous, and pozzolanic cements through a confining passageway, the improvement which comprises admixing with said slurry a turbulence inducer consisting essentially of between 0.01 and 10.0 parts per 100 parts by dry weight of cement in said slurry, of the reaction product of a phenol-formaldehyde condensation product and a bisulfite composition selected from the class consisting of bisulfites and bisulfite addition products prepared by reacting an inorganic bisulfite with a member selected from the class consisting of sugars, sugar esters and sugar amines, whereby turbulence is imparted to said slurry, while passing through said passageway, at a lower rate of flow than will attain a turbulent state in the absence of said turbulence inducer, whereby the loss of slurry through a porous medium in contact with the slurry containing hydroxyethylcellulose is lessened, and whereby the rate of set of the slurry is desirably retarded.

5. The method according to claim 4 wherein said bisulfite composition is a bisulfite addition product prepared by reacting an inorganic bisulfite with a member selected from the class consisting of sugar, sugar esters, and sugar amines.

6. The method of inducing turbulence in an aqueous hydraulic cement slurry while being transferred in a confined passageway and of lessening the loss of fluid from the slurry into a permeable medium with which said slurry comes in contact during the setting period, without necessarily increasing the rate of forward movement of the slurry while being transferred and without undesirably increasing the viscosity of the slurry, which comprises admixing with said slurry between 0.01 and 10.0 parts per 100 parts by dry weight of cement in said slurry of the reaction product of a phenol-formaldehyde resin and the addition product of an alkali metal bisulfite and a reactant selected from the class consisting of sugar, sugar esters and sugar amines, and between about 0.25 and about 1.75 parts of hydroxyethylcellulose per 100 parts by dry weight of cement.

References Cited

UNITED STATES PATENTS

| 3,332,791 | 7/1967 | Steinberg et al. | 106—92 |
| 3,215,549 | 11/1965 | Ericson | 106—90 |
| 3,216,966 | 11/1965 | Collins et al. | 260—38 |
| 3,197,316 | 7/1965 | Beach | 106—90 |
| 2,927,033 | 3/1960 | Benedict et al. | 106—90 |
| 2,229,311 | 1/1941 | Scripture | 106—92 |

FOREIGN PATENTS

| 777,940 | 11/1953 | Great Britain. |
| 514,166 | 6/1955 | Canada. |

TOBIAS E. LEVOW, Primary Examiner

WATSON T. SCOTT, Assistant Examiner

U.S. Cl. X.R.

106—90, 92, 93